United States Patent
Moriwaki et al.

(10) Patent No.: US 7,221,647 B2
(45) Date of Patent: May 22, 2007

(54) PACKET COMMUNICATION APPARATUS AND CONTROLLING METHOD THEREOF

(75) Inventors: Norihiko Moriwaki, Kokubunji (JP); Hirofumi Masukawa, Isehara (JP)

(73) Assignee: Hitachi, Ltd., Tokyo (JP)

( * ) Notice: Subject to any disclaimer, the term of this patent is extended or adjusted under 35 U.S.C. 154(b) by 993 days.

(21) Appl. No.: 10/083,253

(22) Filed: Feb. 27, 2002

(65) Prior Publication Data

US 2003/0128712 A1 Jul. 10, 2003

(30) Foreign Application Priority Data

Jan. 9, 2002 (JP) ............................. 2002-002318

(51) Int. Cl.
*H04L 12/56* (2006.01)

(52) U.S. Cl. ...................... 370/230; 370/416
(58) Field of Classification Search ................ 370/230, 370/235, 232, 389

See application file for complete search history.

(56) References Cited

U.S. PATENT DOCUMENTS 5,140,582 A * 8/1992 Tsuboi et al. ............... 370/416
6,999,415 B2 * 2/2006 Luijten et al. .............. 370/230

OTHER PUBLICATIONS

Chao et al. (Design and implementation of Abacus switch: a scalable multicast ATM switch, Selected Areas in Communications, IEEE Journal on vol. 15, Issue 5, Jun. 1997 pp. 830-843).*

* cited by examiner

*Primary Examiner*—Hassan Kizou
*Assistant Examiner*—Salman Ahmed
(74) *Attorney, Agent, or Firm*—Mattingly, Stanger, Malur & Brundidge, P.C.

(57) ABSTRACT

Disclosed is a packet communication apparatus of large capacity capable of realizing high throughput and packet priority control in packet switching for changing connection of input and output ports of a switch on a variable-length packet unit basis. A variable-length packet is divided into a group of cells in an ingress interface, and the cells are stored in VOQs divided in correspondence with destination output ports of a switch. For each of the VOQs, a corresponding first-cell storing register is provided. When a packet arrives at the head of the VOQ, the first cell indicating an output path of the packet is transferred to a first-cell storing register. Each ingress interface selects one of first cells of packets which can be output and transmits the selected one to the switch. The switch performs a scheduling process so as to select one first cell per output port. The ingress interface to which output permission is given by the scheduling process is connected to a desired output port, and continuously outputs the first cell and the subsequent cells stored in the VOQs to the output port on a packet unit basis.

14 Claims, 13 Drawing Sheets

CELL BIT
 0xx : INVALID CELL
 110 : FIRST CELL
 100 : INTERMEDIATE CELL
 101 : LAST CELL

PACKET COMMUNICATION APPARATUS AND CONTROLLING METHOD THEREOF

FIELD OF THE INVENTION

The present invention relates to a packet data communication apparatus for switching variable-length packets of an IP (Internet Protocol) or the like and fixed-length packets (generally called cells) of the asynchronous transfer mode (hereinbelow, called ATM). More particularly, the invention relates to a packet data transfer controlling method using the communication apparatus.

BACKGROUND OF THE INVENTION

In recent years, data traffic in the Internet and the like is sharply increasing. There is a trend in provision of high-quality, high-reliability services such as transaction process conventionally performed by using a dedicated line via the Internet. Regarding the transfer paths on a network, due to the emergence of wavelength multiplexing techniques, large capacity transfer has now been realized. To comply with this, higher efficiency, larger capacity and higher speed of packet data communication apparatus for performing routing and switching of packet data are necessary.

Japanese Unexamined Patent Publication No. 2000-232482 (hereinbelow, referred to as "Reference 1") discloses an example of a packet switch using a crossbar switch. In the configuration of the packet switch, a variable-length packet input to an ingress interface is divided into a group of cells, and the first cell to which output path information is added is input to the switch. The switch performs a scheduling process of selecting one of requests to output ports in accordance with the information of the first cell, connects input and output ports and, after that, switches a packet.

To the ingress interface, information is supplied about the available output port of the switches. The ingress interface transmits the first cell of a packet desired to be output to an available output port to the switch. In the switch, switching of the input and output ports is performed on a packet unit basis.

Specifically, when an output of cells constructing a packet is started from an ingress interface to an egress interface, the connection of the switch is maintained until all the cells constructing the packet arrive at the egress interface.

Further, in Reference 1, it is sufficient to perform a process of selecting one ingress interface from which cells are desired to be output per output port as a scheduling process of the switch. Consequently, a complicated scheduling process as conventionally required is unnecessary. Also in the case where the number of ports of the switch increases and in the case where the port speed becomes higher, a larger switch capacity is easily realized.

However, in Reference 1, when a plurality of first cells desired to be output to an available output port are supplied from a plurality of ingress interfaces to the switch, the first cells which are not selected as a result of the scheduling process are not output from the switch. That is, until the first cells are selected by a subsequent scheduling process, the first cells are stuck in the switch.

Due to this "stuck" state, a phenomenon called HOL (Head of Line) blocking occurs such that outputting of subsequent priority packets destined for the same output port and packets destined for other available output ports is blocked, usage efficiency of the switch and packet quality class controlling performance remarkably deteriorate depending on the pattern of traffic supplied and a load state, the throughput of the switch deteriorates, and, further, another problem occurs such that priority cannot be given to a packet transferred from the ingress interface to the switch.

An object of the invention is therefore to provide a packet communication apparatus which can be easily adapted to an increased number of ports of a switch and improved port speed and can realize high throughput.

Another object of the invention is to provide a packet communication apparatus in which quality class control is effectively performed. More particularly, an object is to provide a packet communication apparatus which can be easily adapted to an increased number of ports of a switch and improved port speed, and can preferentially output a priority packet over a non-priority packet.

SUMMARY OF THE INVENTION

To achieve the objects, according to the invention, a variable-length packet is divided into a group of cells in an ingress interface, and the cells are stored in queue buffers (hereinbelow, called VOQs) provided for output ports of a switch and quality classes. A first-cell storing register is provided for each VOQ.

When a packet arrives at the head of a VOQ, the first cell of the packet is stored in the first-cell storing register, and the second cell waits at the head of the VOQ. The ingress interface reads the first cell indicating an output path of the packet from the first-cell storing register and supplies it to the switch. In the switch, when a plurality of first cells supplied from ingress interfaces request the same port, a scheduling process is performed so as to select one first cell per output port.

Regarding the ingress interface from which the first cell which is selected as a result of the scheduling process is output, the cells subsequent to the first cell are continuously output from the VOQs. Until all the cells constructing one packet arrive at an egress interface, the connection of the switch is held. Regarding an ingress interface from which the first cell which is not selected as a result of the scheduling process is output, a first cell desired to be output to another available output port is output from the first-cell storing register to the switch, and the scheduling process is tried again.

With this configuration, in the scheduling process, without "sticking" packets which are not selected by the scheduling process, other packets which can be output can be preferentially transmitted. Thus, a packet communication apparatus capable of realizing improved throughput and packet preferential control can be provided.

BRIEF DESCRIPTION OF THE DRAWINGS

Preferred embodiments of the present invention will now be described in conjunction with the accompanying drawings, in which.

DETAILED DESCRIPTION OF THE PREFERRED EMBODIMENTS

Figure 1:
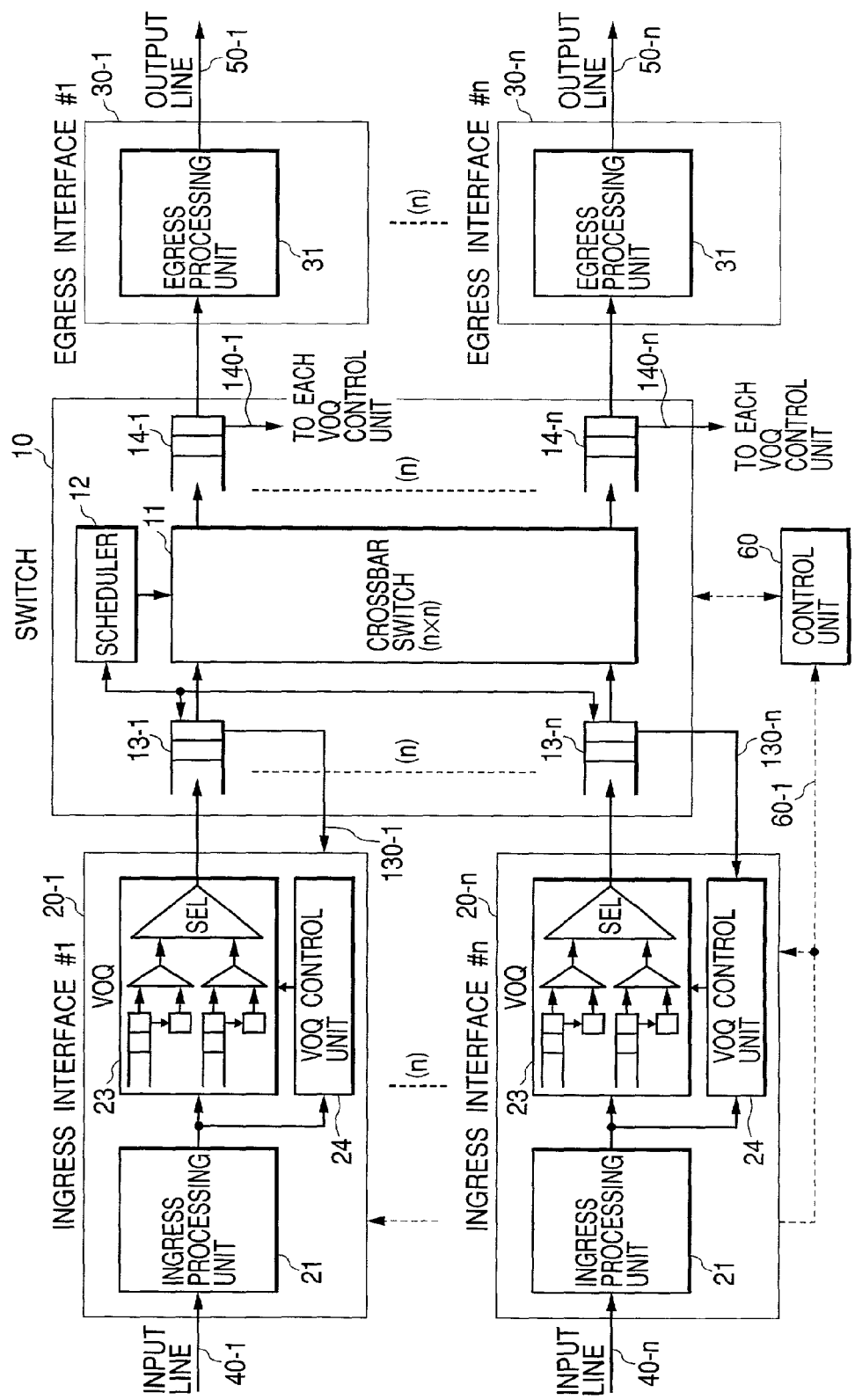
FIG. 1 is a block diagram showing a general configuration of the packet communication apparatus of the invention.

An embodiment of a packet communication apparatus according to the invention will now be described. FIG. 1 is a diagram showing the general configuration of the packet communication apparatus of the invention. The packet communication apparatus comprises a switch 10 having (n) input/output ports and performing n×n switching, ingress interfaces 20-1 to 20-n, egress interfaces 30-1 to 30-n, and a control unit 60 which are connected to the switch 10. The ingress interfaces 20-1 to 20-n accommodate input lines 40-1 to 40-n, respectively, perform a process of routing and buffering an input variable-length packet, and perform a process of transmitting data in the format of a fixed-length cell to the switch 10. The egress interfaces 30-1 to 30-n receive cells from the switch 10 and output the data in the format of an original variable-length packet to output lines 50-1 to 50-n. The control unit 60 is connected to the switch 10, ingress interfaces 20, and egress interfaces 30 via a control bus 60-1 and performs initial setting, failure monitoring, and the like. In many cases, the ingress interfaces 20-1 to 20-n and egress interfaces 30-1 to 30-n are physically mounted in the same card.

Figure 2:
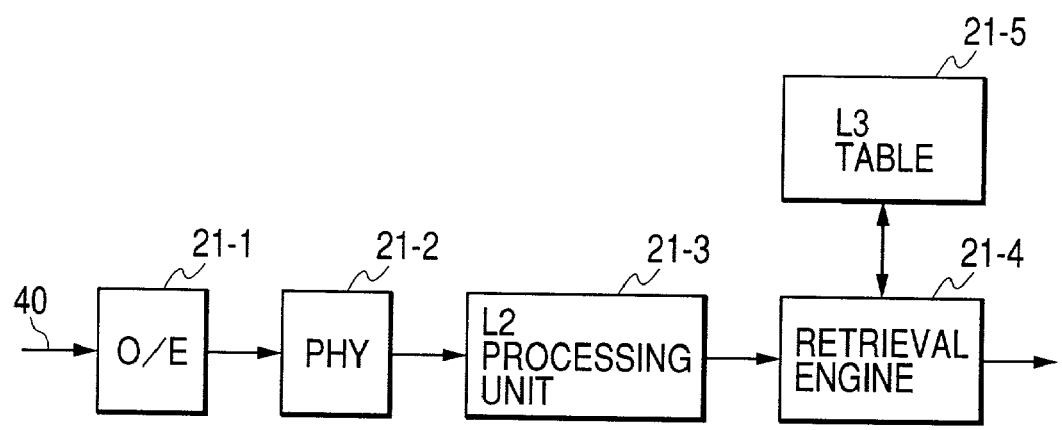
FIG. 2 is a block diagram showing the configuration of an ingress interface card of the packet communication apparatus of the invention.

First, the configuration of the ingress interface 20 will be described in detail. The ingress interface 20 has an ingress processing unit 21, a VOQ 23, and a VOQ control unit 24. Referring to FIG. 2, an example of the configuration of the ingress processing unit 21 will be described. When packet data is input to the apparatus via an input line 40, it is converted to an electrical signal by an optoelectronic (O/E) signal converting unit 21-1. After that, the electric signal is subjected to a physical layer process such as a SONET (synchronous optical network) frame by a PHY 21-2. In an L2 processing unit 21-3, a layer 2 process such as extraction of a packet and error check is performed. In a retrieval engine 21-4, a layer 3 process such as output port retrieval and quality class retrieval based on a destination IP address is performed.

Figure 5:
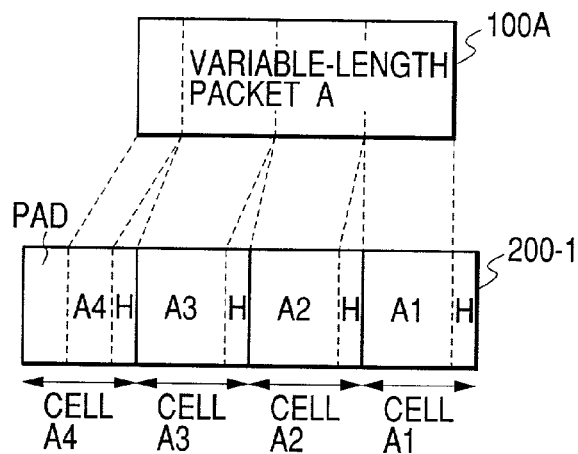
FIG. 5 is a block diagram showing an operation of dividing a packet into cells in the packet communication apparatus of the invention.

The retrieving process, concretely, uses an L3 table 21-5 connected to the retrieval engine 21-4. In the L3 table 21-5, the corresponding relations of destination IP address, output port, quality class, and next hop IP address as an IP address of the next transfer destination are stored in a table format. The result of retrieval is given to the header of a packet. As shown in FIG. 5, the retrieval engine 21-4 divides a variable-length packet into fixed-length cells and gives a cell header 200-1 to each of the cells.

Figure 6:
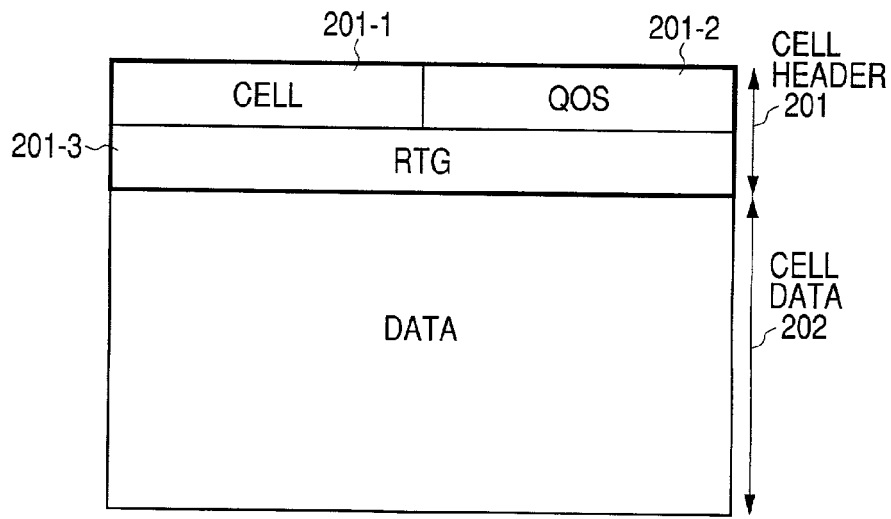
FIG. 6 is a diagram showing the format of a cell used in the packet communication apparatus of the invention.

FIG. 5 shows an example in which a variable-length packet 100A is divided into cells A1 to A4. In the case where the last cell has a fraction, PAD is inserted into the vacant area in the cell. FIG. 6 shows an example of a cell format. The cell is constructed by cell data 202 and a cell header 201. The cell header 201 includes a CELL 201-1 indicative of the validity/invalidity of the cell and the first, intermediate, or last cell, a QOS 201-2 indicative of the quality class of the packet, and routing information RTG 201-3 indicative of a destination port of the switch. In the cells subsequent to the first cell, the same process as that performed on the first cell is performed without referring to the RTG 201-3 and QOS 201-2, and these areas may be used as data areas.

Figure 4:
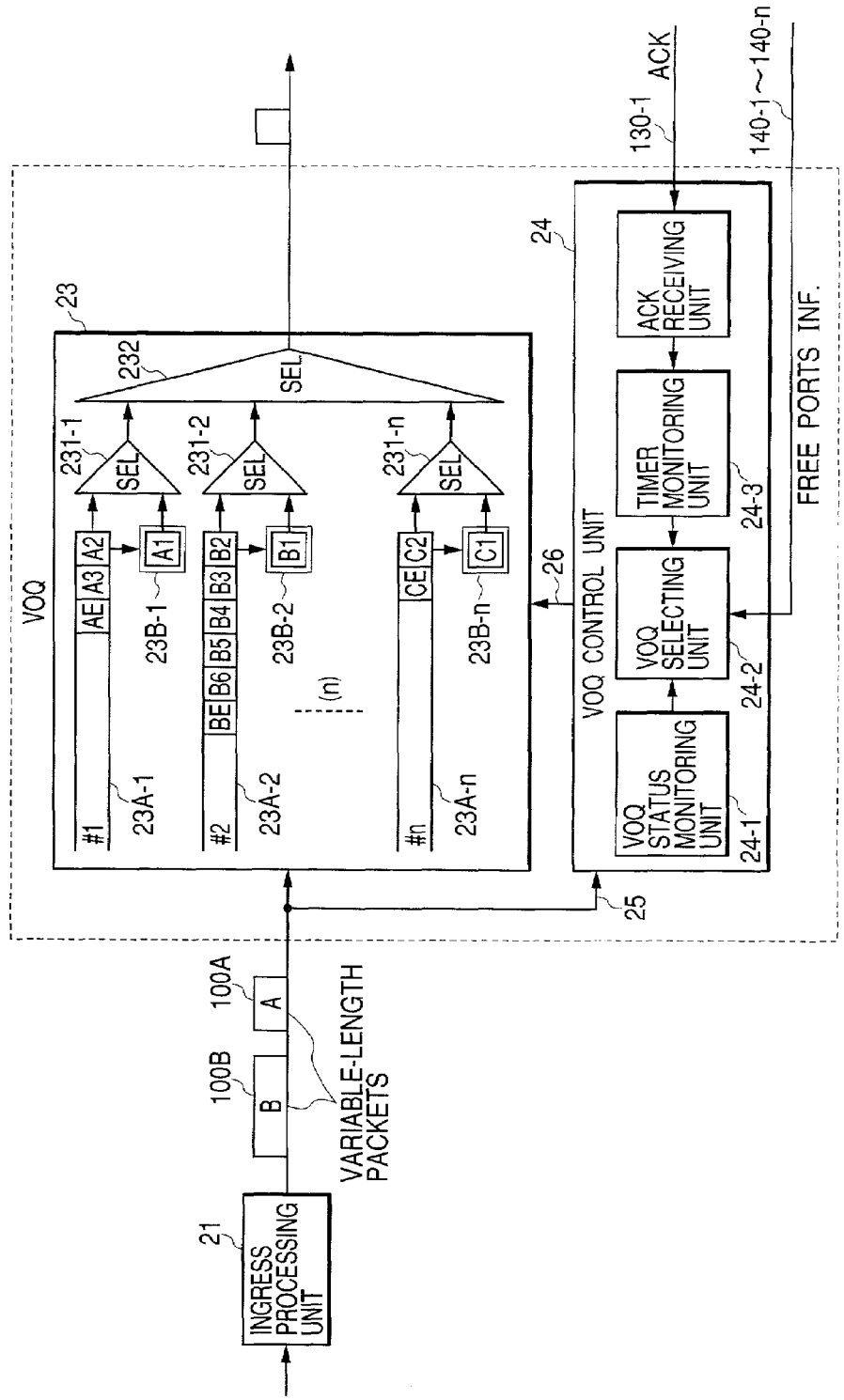
FIG. 4 is a block diagram showing the configuration of a line interface card of the packet communication apparatus of the invention.

With reference to FIG. 4, an example of the function and operation of the other portion of the ingress interface 20 (FIG. 1) will now be described. The cell header information 200-1 (FIG. 5) is taken out from the first cell of each of variable-length packets 100A and 100B output from the retrieval engine 21-4 (FIG. 2) and transmitted via a connection line 25 to the VOQ control unit 24. The VOQ control unit 24 analyzes the header information and instructs a write address of the VOQ 23 so that packets are sequentially stored in VOQs (any of 23A-1 to 23A-n) corresponding to output paths of the variable-length packet. In a VOQ 23A, when the packet comes to the head of a queue, the first cell of the packet is moved to a first-cell storing register 23B.

That is, at the head of a queue, the second and subsequent cells constructing the packet are stored. In each VOQ, a SEL 231 is disposed so that the first cell stored in the first-cell storing register 23B or any of the second and subsequent cells stored in the VOQ 23A can be selected and output. At the time of reading a VOQ, a VOQ is selected by a selector 232 in accordance with an instruction from the VOQ control unit 24. The VOQ control unit 24 selects, according to switch available output port information 140-1 to 140-n, a VOQ corresponding to an available output port in a round-robin manner or the like and gives a read instruction to the VOQ 23. The VOQ control unit 24 is provided with a timer monitoring unit 24-3. The timer monitoring unit 24-3 monitors whether or not an acknowledge (ACK) 130-1 to a request is returned within a specified time since the first cell for an output request is output to the switch, and notifies a VOQ selecting unit 24-2 of the result.

Further, when the first cells A1 to C1 are output as output requests to the output port via the selectors 231 and 232 in FIG. 4, the first cells are not discarded from the first-cell storing registers 23B-1 to 23B-n but copied and held in the first-cell storing register.

Referring again to FIG. 1, the switch 10 of the packet communication apparatus of the invention will now be described in detail. The switch 10 includes ingress FIFO (First In First Out) buffers 13-1 to 13-n provided in correspondence with input ports, a crossbar switch 11 for performing n×n switching, a scheduler 12, and egress buffers 14-1 to 14-n provided in correspondence with output ports.

If a cell received from the ingress interfaces 20-1 to 20-n is the first cell, it is stored and held in an ingress FIFO buffer 13. The cell header of the first cell is sent to the scheduler 12. The scheduler 12 analyzes an output port desired by the input first cell and, if a plurality of first cells desire the same output port, performs a scheduling process so as to select one first cell per output port.

The scheduler 12 preferentially transfers a first cell having high priority by referring to the cell header. When a plurality of packets have the same priority, the scheduler 12 selects the first cell to be switched in a round robin (cyclic selection) manner. The crossbar switch 11 is connected so that the first cell which obtained the output permission is output to a desired destination, and the first cell is read from the ingress FIFO buffer 13 and output.

Simultaneously, the result is returned as an acknowledge (ACK) 130-1 to the ingress interface 20 from which the selected first cell is output. On receipt of the ACK 130-1, the ingress interface 20 reads the remaining second and subsequent cells constructing the same packet from the VOQ 23, and outputs the cells to the switch 10. The crossbar switch 11 maintains the connection of the input/output ports for the period since the cells subsequent to the first cell are continuously output and all the cells constructing one packet reach the egress interface.

An ingress interface as an output source of the first cell which is not selected as a result of scheduling detects that the ACK 130-1 is not returned in the specified time by the timer monitoring unit 24-3 (FIG. 4) in the VOQ control unit 24. In the case of time-out, the VOQ selecting unit 24-2 (FIG. 4) is notified of the time-out. If there is a packet destined for another available output port, the first cell of the packet is read from the first-cell storing register 23B and transmitted to the switch 10. The first cell stored in the ingress FIFO buffer 13 is overwritten with the first cell that was newly transmitted, and the result is again subjected to the next scheduling. The egress buffers 14-1 to 14-n provided for the output ports of the switch always monitor whether cells constructing a packet are being transferred or not, and notify the status as the available output port information 140-1 to 140-n to the VOQ control units 24 in the ingress interfaces 20-1 to 20-n. More concretely, the egress buffers 14-1 to 14-n monitor the CELL 201-1 given to the cell header 201 and, on completion of transfer of a valid cell, notify the VOQ control units 24 of the available port information 140-1 to 140-n.

Figure 3:
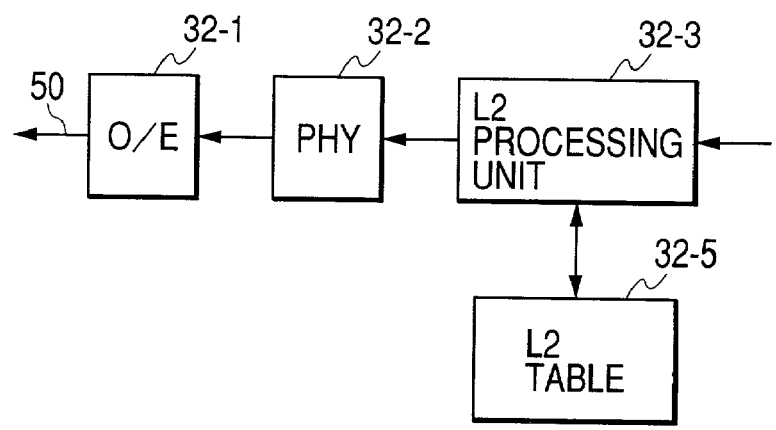
FIG. 3 is a block diagram showing the configuration of the egress interface card of the packet communication apparatus of the invention.

Finally, the configuration of the egress interfaces 30-1 to 30-n of FIG. 1 will be described in detail. The cells in the unit of the variable-length packet output from the switch 10 are transmitted to an egress processing unit 31 in each of the egress interfaces 30-1 to 30-n. The configuration of the egress processing unit 31 will be described by referring to FIG. 3. The input fixed-length cells are assembled into the original variable-length packet by an L2 processing unit 32-3 and, after that, the layer 2 process is performed.

For example, in the case where the egress line is the Ethernet, a process of retrieving a layer 2 address (MAC address) of a router to be connected from next hop IP addresses as IP addresses of the next transfer destination and supplying it, is performed. The correspondence between the next hop IP address and the layer 2 address of the connection destination router is stored in an L2 table 32-5. After the layer 2 process is finished, the variable-length packet is mapped to, for example, a SONET frame by a PHY 32-2, the result is converted into an optical signal by an electronic/optical (E/O) signal converting unit 32-1, and the optical signal is transmitted to an output line 50.

Figure 7:
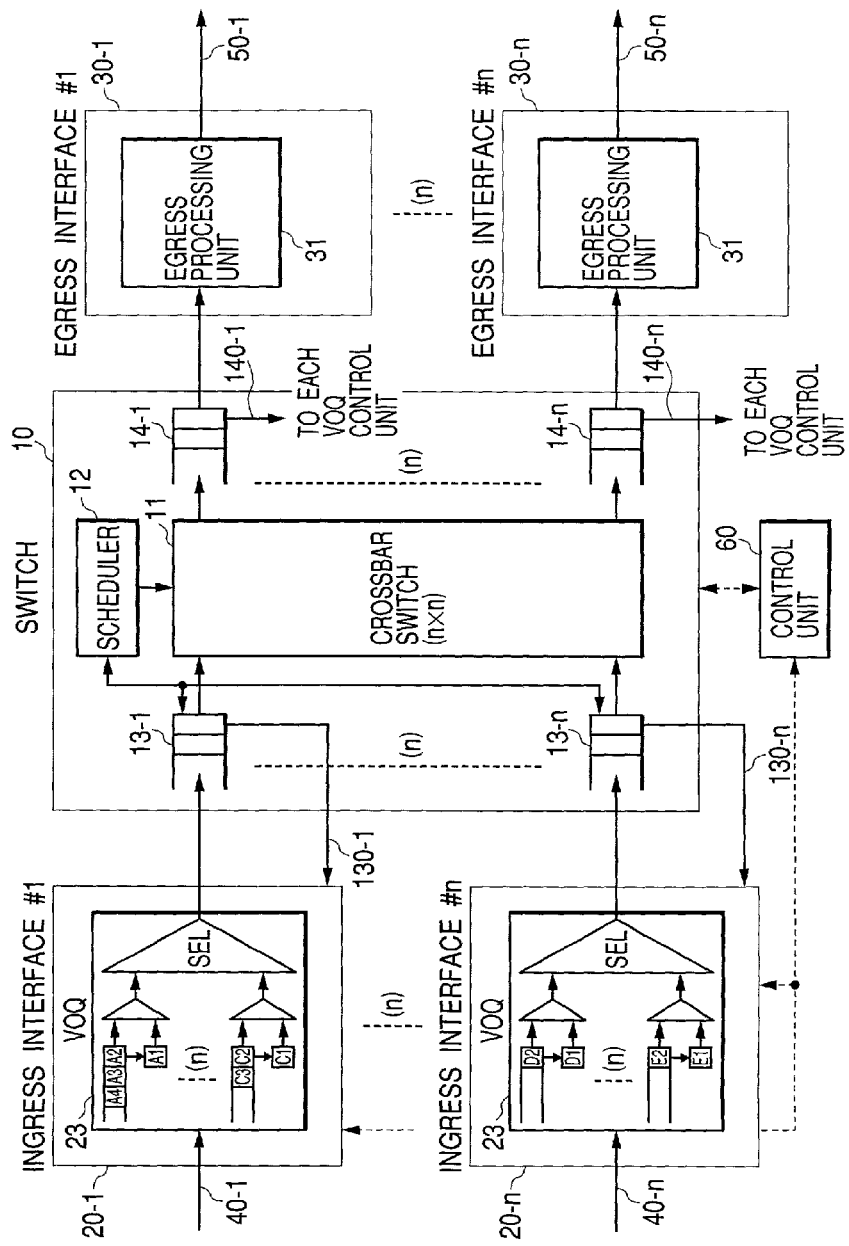
FIG. 7 is an explanatory diagram showing a switching operation of the packet communication apparatus of the invention.

An example of an actual packet switching operation in the packet communication apparatus according to the invention will now be described in comparison to Reference 1. An example of switching of the packet communication apparatus according to the invention will be described by referring to FIGS. 7 to 9. In FIG. 7, a packet A (divided into cells A1, A2, A3, and A4) destined for the output line 50-1 and a packet C (divided into cells C1, C2, and C3) destined for the output line 50-n are input to the ingress interface 20-1, and a packet D (divided into cells D1 and D2) destined for the output line 50-n and a packet E (divided into cells E1 and E2) destined for the output line 50-n are input to the ingress interface 20-n. It is assumed that switch ports to which the output lines 50-1 and 50-n are connected are available at this time point.

Figure 8:
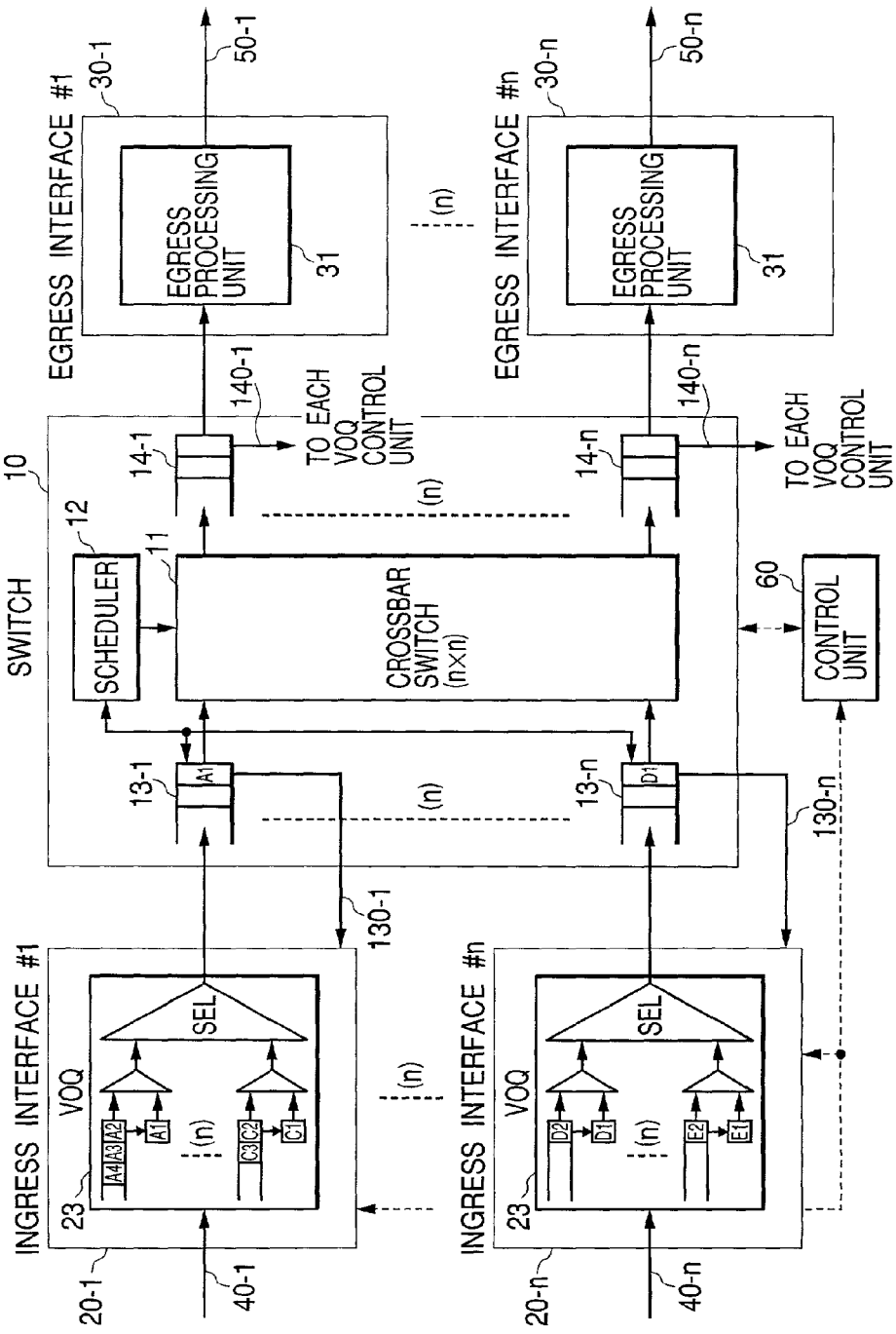
FIG. 8 is an explanatory diagram showing a switching operation of the packet communication apparatus of the invention.

In FIG. 8, it is assumed that since the switch output port for the egress interface 30-1 is available, the first cell A1 of the packet A is transferred from the ingress interface 20-1 to the ingress FIFO buffer 13-1 of the switch 10, and the first cell D1 of the packet D is transferred to the ingress FIFO buffer 13-n of the switch 10 from the ingress interface 20-n. In this case, since the same output port is requested by the first cells A1 and D1, a selecting process is performed by the scheduler 12.

Figure 9:
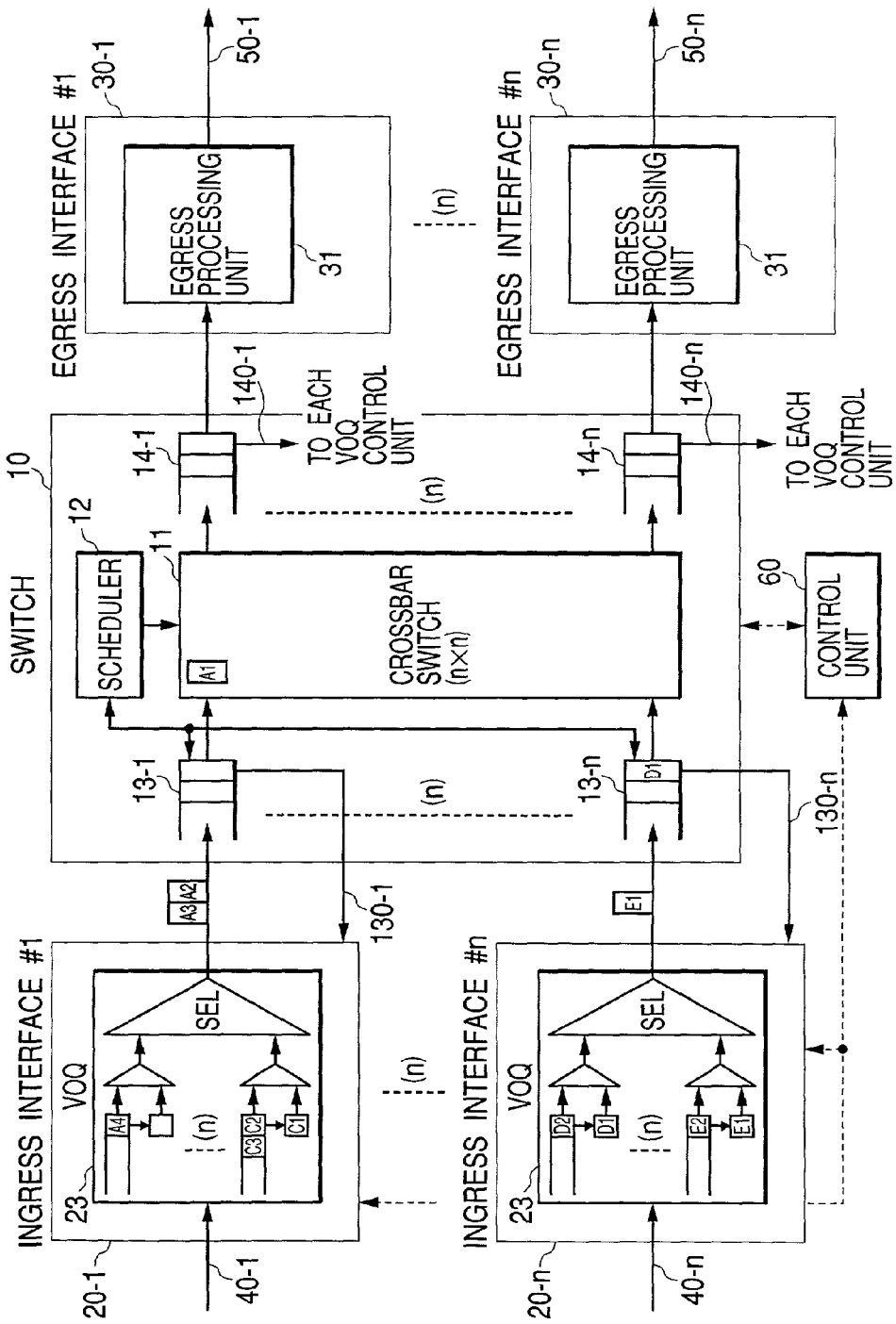
FIG. 9 is an explanatory diagram showing a switching operation of the packet communication apparatus of the invention.

FIG. 9 shows, as an example, a case where the first cell A1 is selected as a result of the selecting process by the scheduler 12 and the first cell D1 is not selected. The ingress interface 20-1 is notified of the ACK 130-1 indicating that the subsequent cells can be transferred and, accordingly, the cells A2, A3, and A4 are continuously transferred to the switch and are output to the desired output port.

On the other hand, in the ingress interface 20-n, when the timer monitoring unit 24-3 (FIG. 4) detects that the ACK 130-n is not notified within a predetermined time, it is determined that the request is not accepted, the first cell E1 of the packet E is transferred to the ingress FIFO buffer 13-n, and subjected again to the selecting process in the scheduler 12 for another available output port.

Figure 10:
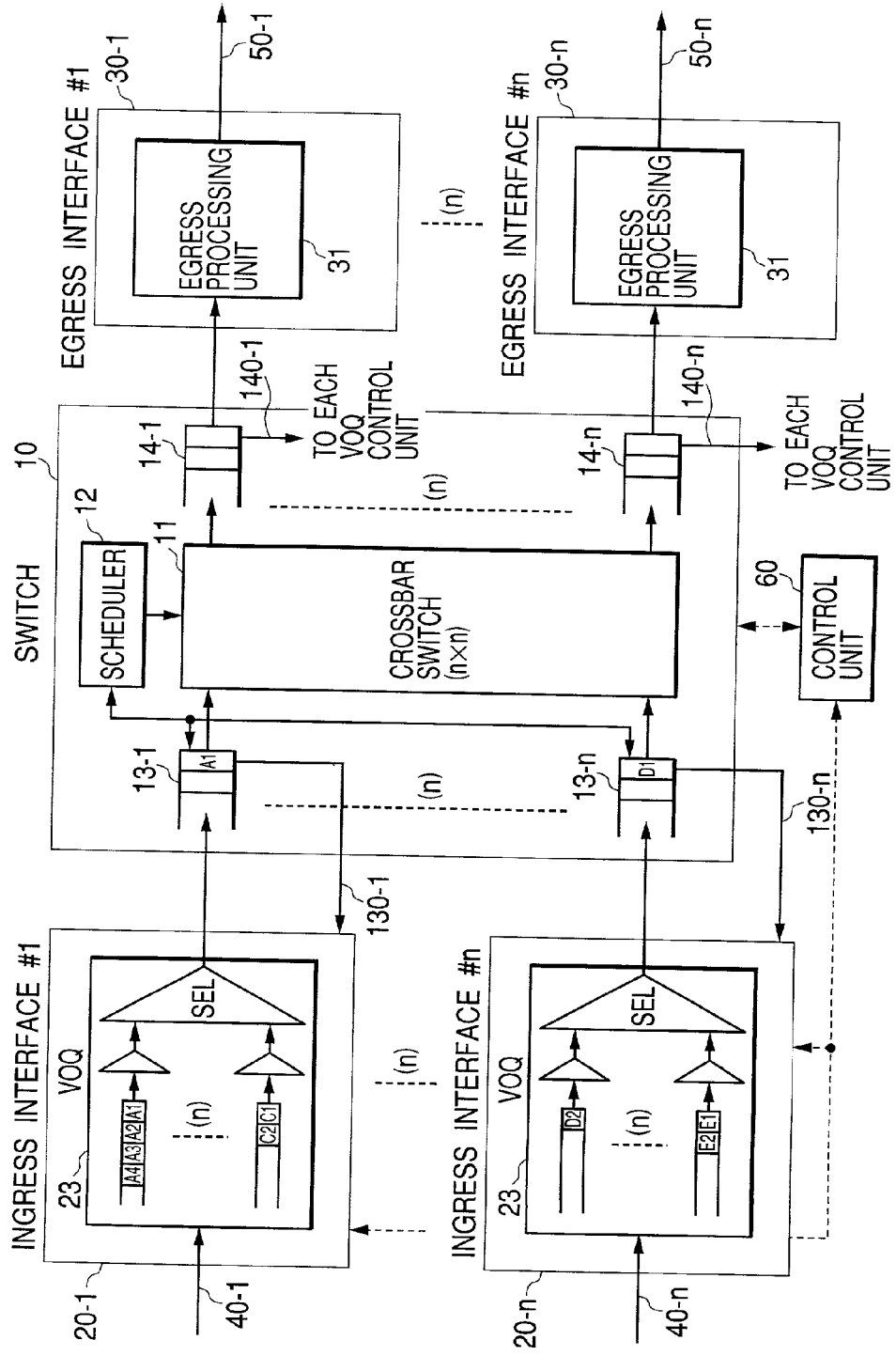
FIG. 10 is an explanatory diagram showing a switching operation of a conventional packet switch of large capacity.

An example of switching a packet in Reference 1 will now be described by referring to FIG. 10. In FIG. 10, when it is assumed that the output port in the switch 10 for the egress interface 30-1 is available, the first cell A1 of the packet A is transferred from the ingress interface 20-1 to the ingress FIFO buffer 13-1, and the first cell D1 of the packet D is transferred from the ingress interface 20-n to the ingress FIFO buffer 13-n in the switch 10.

In FIG. 10, when it is assumed that the first cell A1 is selected as a result of the selecting process in the scheduler 12, there is the possibility that the first cell D1 is "stuck" in the switch for long time.

Further, as described above, the phenomenon called HOL (Head of Line) blocking, wherein subsequent priority packets destined for the same output port and subsequent packets destined for another available output port have to wait to be output, occurs. As a result, the usage efficiency of the switch and the packet quality class control performance may seriously deteriorate depending on the pattern of input traffic and the load state.

In contrast, in the packet communication apparatus according to the invention shown in FIGS. 7 to 9, since a packet which is not selected in the scheduling process is discarded from the ingress FIFO buffer, the problem that the packet is "stuck" in the switch is solved. Further, other packets which can be output can be preferentially transmitted, so that a packet communication apparatus having high throughput can be provided.

Figure 11:
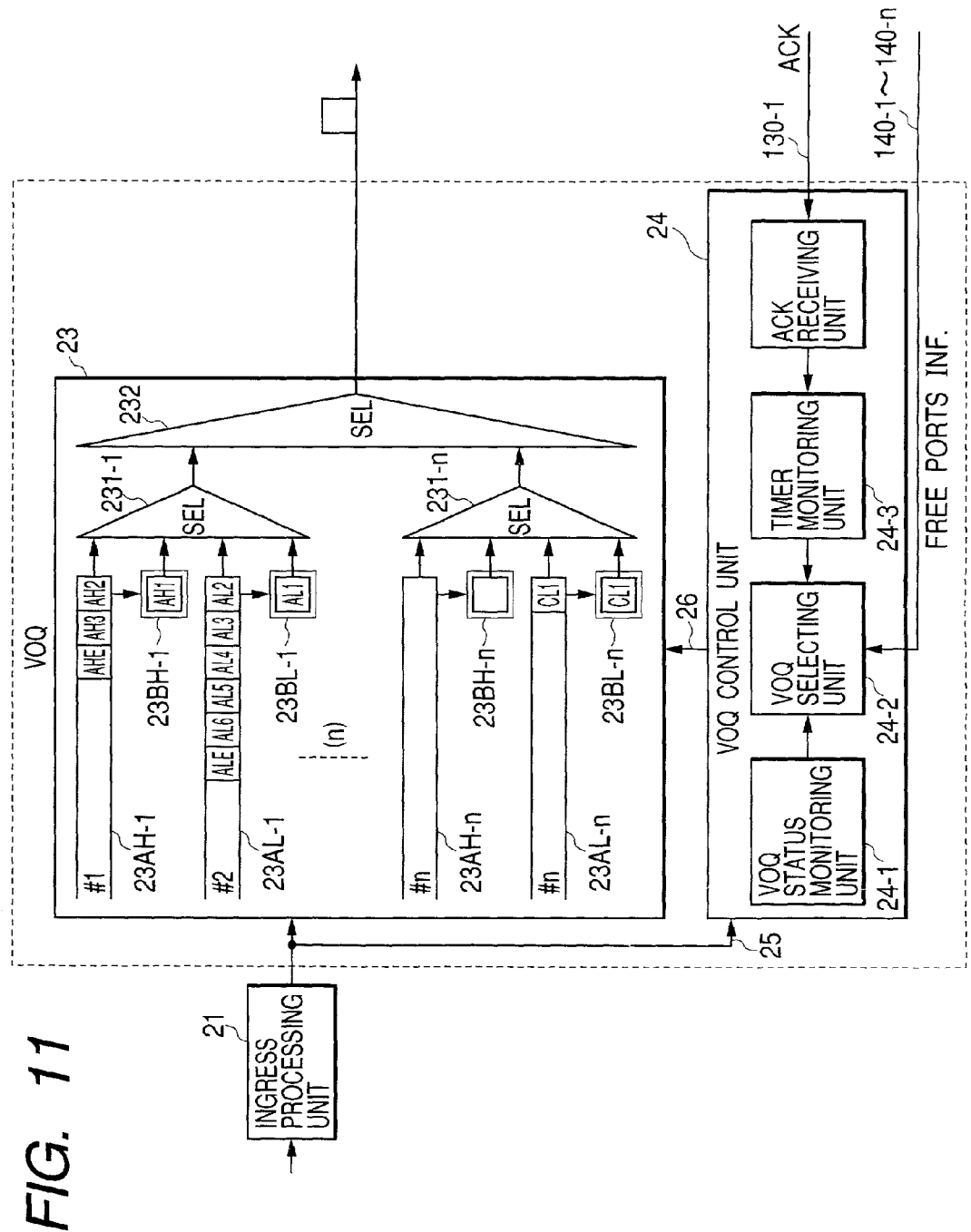
FIG. 11 is a block diagram showing another configuration of a line interface card of a packet communication apparatus of the invention.

As a second embodiment of the invention, a form of performing quality class control in a switch will be described by referring to FIG. 11. In a line interface adapted to quality control shown in FIG. 11, only parts different from those of the ingress interface 20 shown in FIG. 4 are illustrated. The line interface adapted to quality control has, in the VOQ 23, VOQs for two different quality classes (high-priority VOQs 23AH-1 to 23AH-n and low-priority VOQs 23AL-1 to 23AL-n), which correspond to (n) output paths. A packet transferred from the ingress processing unit 21 is input to an applicable VOQ in accordance with the RTG 201-3 and QOS 201-2 in the cell header 201 shown in FIG. 6. The VOQ control unit 24 performs, for example, round-robin selection which gives priority to a high-priority queue. Specifically, when a reading instruction to a certain path is received, path selection is performed by the SEL 232. Simultaneously, if a packet exists in the high-priority VOQ 23AH-x (x indicates any of 1 to n), the packet is read by the quality class selector SEL 231. If no packet exists in the high-priority VOQ23AH-x, a packet is read from the low-priority VOQ 23AL-x.

According to the embodiment, in the case where a low-priority packet constructed by VOQs 23AL-1 to 23AL-n destined for a certain output port is stored in the ingress FIFO buffer 13 of the switch 10 (FIG. 1) and is not selected by the scheduler 12, a high-priority packet constructed by VOQs 23AH-1 to 23AH-n which arrive later can be re-transmitted. That is, the high-priority packet can be prevented from being blocked by the low-priority packet, so that a packet communication apparatus which can be adapted to high-quality services necessary for moving-picture communication, transaction processes and the like can be provided.

A third embodiment of the invention will now be described. In the foregoing first and second embodiments, the example of transferring only the first cell stored in the first-cell storing registers 23B-1 to 23B-n to the input FIFO buffer 13 of the switch 10 and the example of re-transmitting only the first cell have been described.

However, depending on a mounting condition, there is a case that a time lag occurs between the time when the ACK 130 is returned to the VOQ control unit 24 and the time when the subsequent packet is output. In order to eliminate the time lag, an example of performing a similar process on not only the first cell, but a unit of (m) cells from the first cell will be described hereinbelow (where m≧2).

Figure 12:
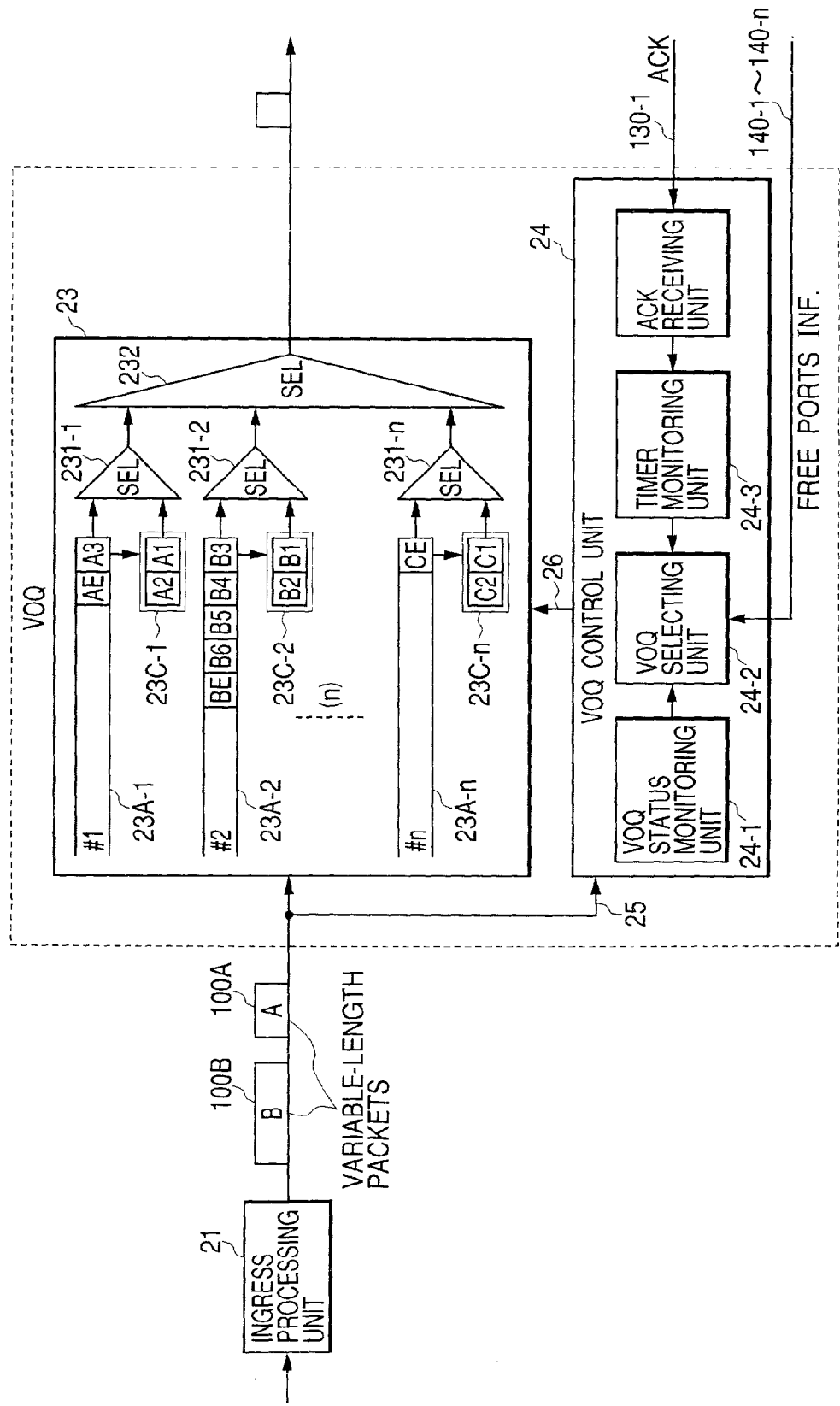
FIG. 12 is a block diagram showing another configuration of the line interface card of the packet communication apparatus of the invention.

Specifically, as shown in FIG. 12, in the ingress interface 20, first cell group registers 23C-1 to 23C-n corresponding to VOQs 23A-1 to 23A-n, respectively, are provided. When a packet arrives at the head of the VOQs 23A-1 to 23A-n, the first cell group of the packet is transferred to the first cell group storing registers 23C-1 to 23C-n. Each of the first cell group storing registers 23C-1 to 23C-n is a register for storing (m) cells.

FIG. 12 shows the case where m=2 as an example. When there is an output request, one first cell group of a packet which can be output is selected in the ingress interface 20 and is transmitted to the ingress FIFO buffer 13 in the switch 10 (FIG. 1).

The first cell group which has obtained output permission as a result of the scheduling process is read and output and, simultaneously, an instruction is given to the ingress interface 20 so as to continuously output the subsequent cells. In the case where there is a packet desired to be output to another available port in the ingress interface 20 which has not received an output permission, the first cell group of the packet is output to the ingress FIFO buffer 13 of the switch 10, the previous first cell group is overwritten with the output first cell group, and the scheduling process is performed again.

It is sufficient to determine the value of (m) so that the time required for the subsequent cells stored in the VOQ 23A to reach the ingress FIFO buffer 13 since the output is permitted as a result of scheduling becomes equal to the time of (m) cells. Consequently, when the ingress interface 20 receives an output permission, the subsequent packets can catch up with the first cell group stored in the ingress FIFO buffer 13.

Therefore, since the packet switching is performed in the form of continuous cells without a time lag, the throughput of the switch is improved. Further, as a form of expanding the embodiment, a method of using not the first cell group unit but a packet unit as the unit employed at the time of an output request and at the time of retransmission can also be considered.

Finally, a fourth embodiment of the invention will be described. In the foregoing embodiments, in the egress buffers 14-1 to 14-n shown in FIG. 1 provided for the output ports of the switch, whether cells are being transferred or not is always monitored, and the VOQ control unit 24 is notified of the available output port information 140-1 to 140-n.

However, depending on mounting conditions, as it takes time from when the VOQ control unit 24 is notified of the available output port information 140-1 to 140-n until the first cell is output and the next output request is entered to the scheduler, there is a case that an idle time (for example, the time of "j" cells) occurs in the output line.

Figure 13:
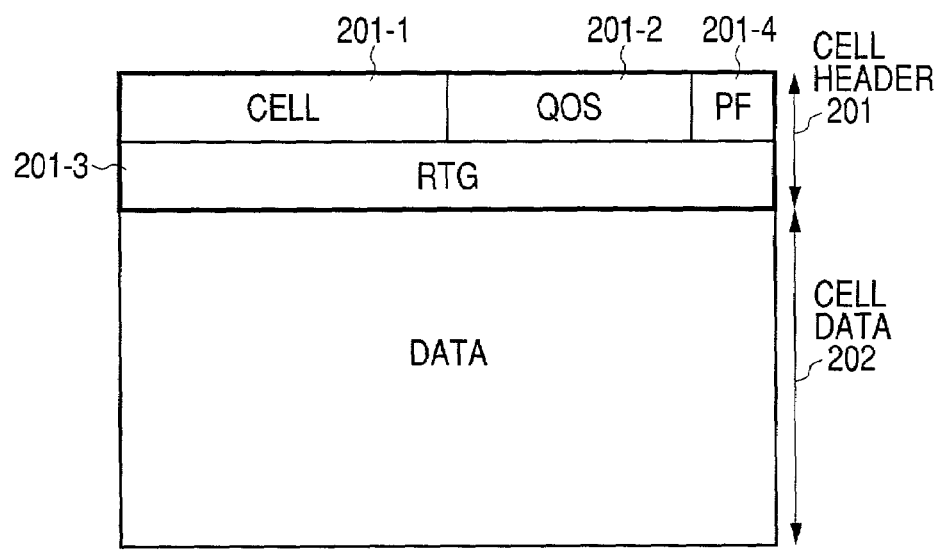
FIG. 13 is a diagram showing another cell format used in the packet communication apparatus of the invention.

In order to eliminate the idle time, before the last cell of the packet passes through the crossbar switch 11, the output port is determined as an available port. As a concrete method, as shown in FIG. 13, an available port bit (PF) 201-4 is defined ("1": port being used, "0": port available) in the cell format of the cell header 201 (FIG. 6). In the ingress processing unit 21 (FIGS. 1 and 12), when a packet is divided into cells, with respect to the last "j" cells including the last cell of the packet, PF201-4 is set to "0" and, with respect to the other cells, PF201-4 is set to "1". In the egress buffers 14-1 to 14-n, when PF201-4="0" is detected, it is sufficient to notify the VOQ control unit 24 of the release of the port.

In order to eliminate the idle time as described above, the available port bit is set in the cell header. By the setting of the available port bit, an effect produced by the packet data transfer according to the embodiment will be described in comparison with the conventional packet data transfer.

Figure 16A:
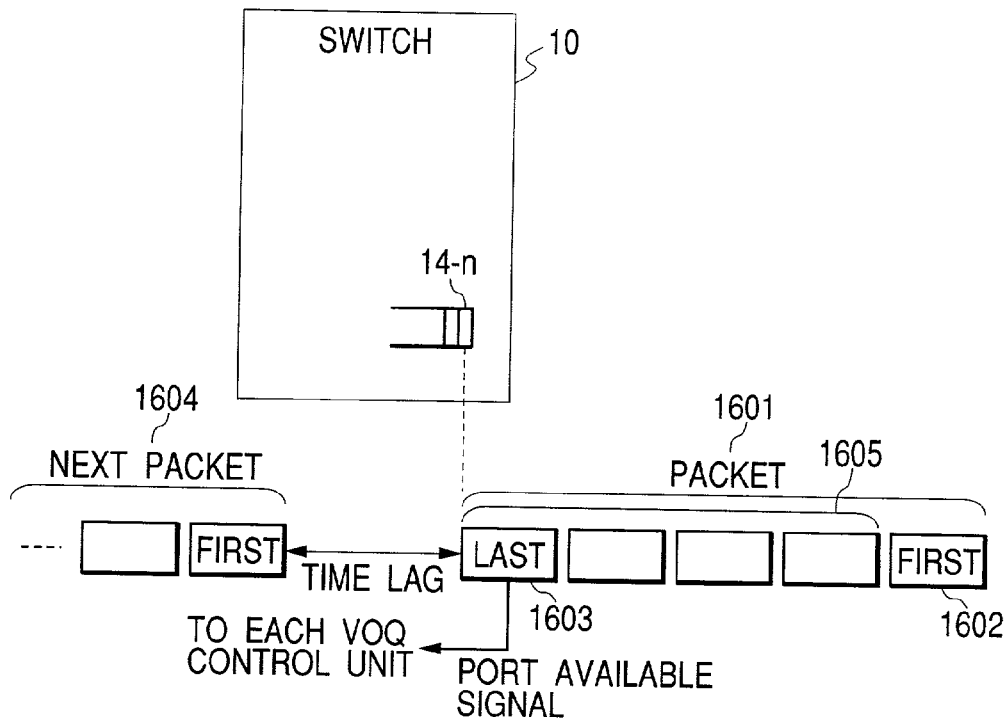
FIG. 16A is a diagram showing a time lag which occurs between a packet and the next packet at the time of transfer of packet data in a conventional technique.

First, an example of packet data transfer in the conventional technique will be described. As shown in FIG. 16A, a packet 1601 is output from the ingress interface 20 (FIG. 1) and reaches the switch 10. The packet 1601 is constructed by a first cell 1602 and subsequent cells 1605 including the last cell 1603. When the packet 1601 passes through the output port 14-n of the switch 10, the last cell 1603 is monitored and the VOQ control unit 24 (FIG. 1) is notified of the fact that the output port 14-n becomes available. The VOQ control unit 24 transmits the next packet 1604 in response to the notification signal. However, it causes the problem that a time lag occurs between the transmission of the packet 1601 and transmission of the next packet 1604.

Figure 16B:
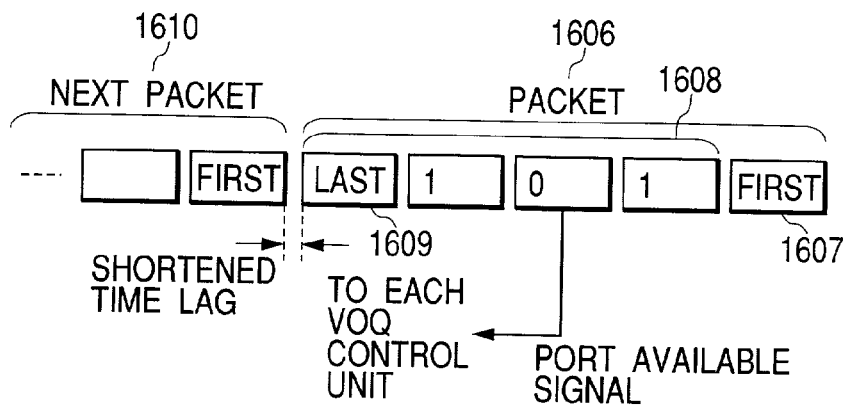
FIG. 16B is a diagram showing a time lag which occurs between a packet and the next packet in the case where an available port bit of the invention is added.

An example of packet data transfer according to the embodiment will now be described. As shown in FIG. 16B, the available port bit is added to one of the subsequent cells 1608 before the last cell 1609 in a packet 1606. The packet 1606 is constructed by a first cell 1607 and subsequent cells 1608 including the last cell 1609.

With the arrangement, the cell 1608 with the available port bit at the output port 14-n can be monitored. Therefore, by referring to the available port bit, before the actual last packet passes, transmission of the next packet can be requested to the VOQ control unit 24.

A detection signal is sent to the VOQ control unit 24. It produces an effect such that transmission of the next packet 1610 in response to the instruction of the VOQ control unit 24 is more rapid, and the time lag between the packet 1606 and the next packet 1610 is shortened as compared with the conventional case shown in FIG. 16A. In each of packets 1601, 1606, 1604, and 1610 shown in FIGS. 16A and 16B, "FIRST" and "LAST" indicate the first cell and the last cell, respectively.

Figure 14:
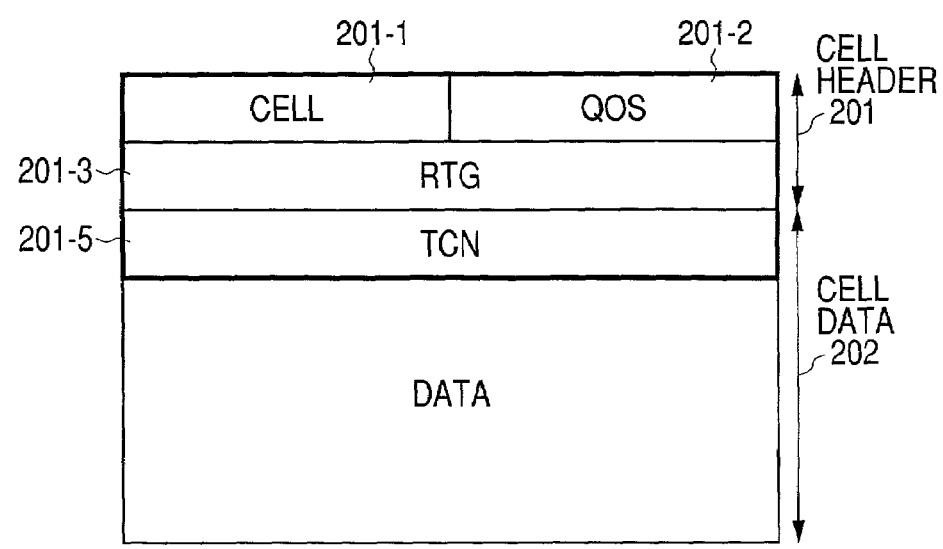
FIG. 14 is a diagram showing another cell format used in the packet communication apparatus of the invention.

As another method, as shown in FIG. 14, a total cell number information bit (TCN) 201-5 is defined in the cell format of the cell header 201. When a packet is divided into cells, the ingress processing unit 21 (FIG. 1) calculates the number of divided cells from the packet length and writes the number of cells into the TCN 201-5 of the first cell.

Figure 15:
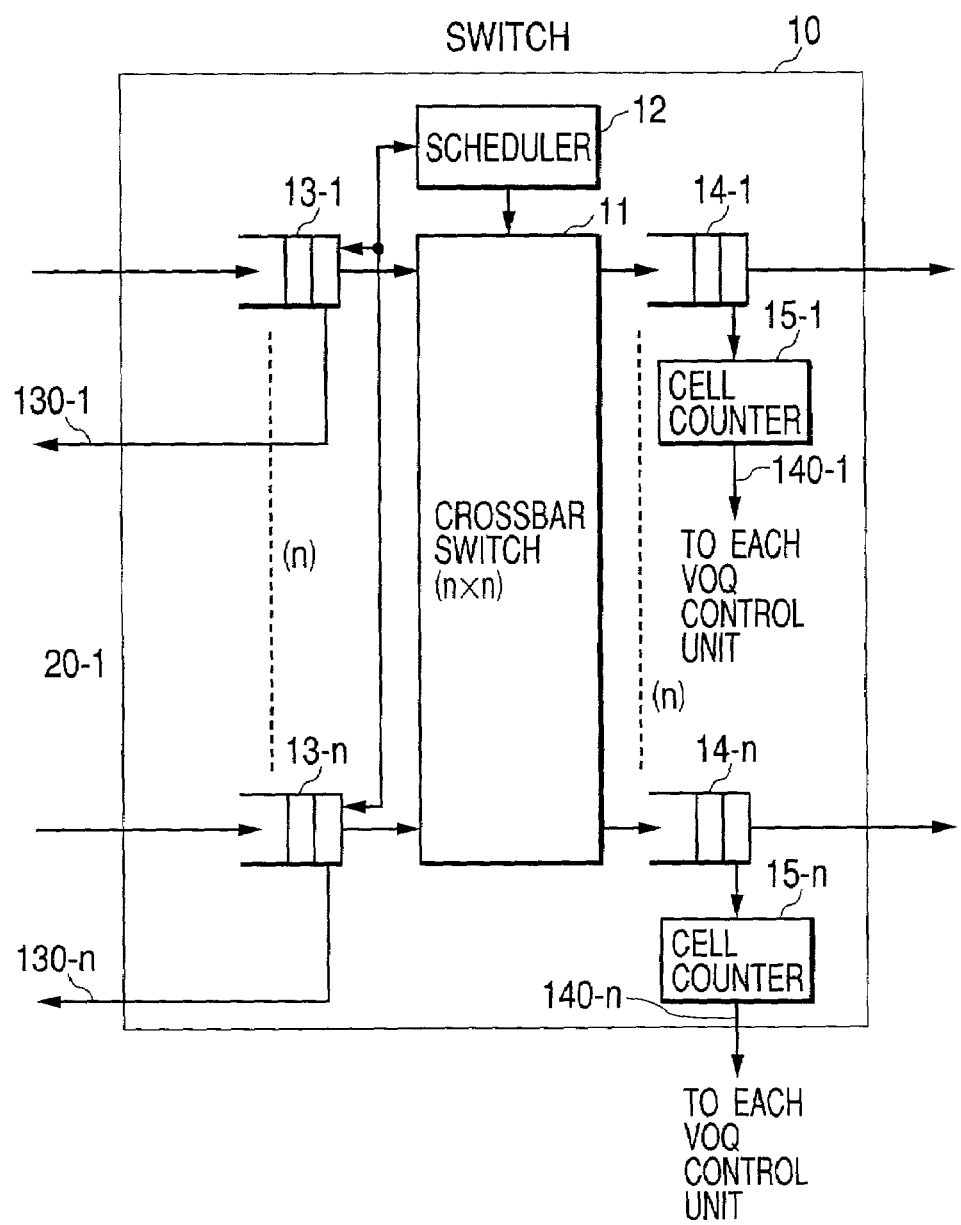
FIG. 15 is a block diagram showing another configuration of a switch in the packet communication apparatus of the invention.

In the switch 10, as shown in FIG. 15, cell counters 15-1 to 15-n connected to the egress buffers 14-1 to 14-n, respectively are provided. When the first cell is detected, the egress buffers 14-1 to 14-n obtain the number of divided cells from the TCN bit 201-5 and store it in the cell counters 15-1 to 15-n. Each time a subsequent cell arrives, the cell counters 15-1 to 15-n are decremented. When the counter value becomes "j", the VOQ control unit 24 is notified of release of the port, and the cell counters 15-1 to 15-n are reset. It is sufficient to add the TCN 201-5 only to the first cell.

The characteristics of the packet communication apparatuses according to the first to fourth embodiments of the invention have been described above. Further, each of the packet communication apparatuses in the first to fourth embodiments may be provided as packet communication apparatuses having the characteristic points (a) to (k) as described below.

(a) A packet communication apparatus including: an ingress interface for inputting plural packet data; a switch for switching paths of the packet data, having a plurality of input ports, a plurality of output ports, and a scheduler; and an egress interface for transmitting the packet data transferred through the path switched, the ingress interface having a plurality of ingress buffers for storing the plural packet data, a plurality of storing units corresponding to the plurality of ingress buffers, and a buffer control unit for controlling the ingress buffers and storing units, and each of the input ports having a port buffer, wherein when the packet data arrives at the head of the ingress buffer, a data portion including destination information in the packet data is transferred to the storing unit, the port buffer stores the data portion which is output from the storing unit and, when output of the data portion to a predetermined output port is not permitted by the scheduler, the port buffer discards the data portion, receives the data portion retransmitted from the storing unit in response to an output request sent again from the buffer control unit and determines whether to transfer the data portion to the predetermined output port in accordance with an instruction of the scheduler.

(b) The packet communication apparatus described in (a), characterized in that the buffer control unit selects one of a plurality of data portions included in the plurality of storing units, copies the one from the storing unit, and outputs the one to the port buffer.

(c) The packet communication apparatus described in (a), characterized in that when the scheduler permits output of the data portion to the predetermined output port, the data portion and the packet data subsequent to the data portion are transferred to the predetermined output port via a switched path.

(d) The packet communication apparatus described in (a), characterized in that the ingress interface has selectors of the same number as that of the ingress buffers, and the selector selects either the packet data portion other than the data portion of the ingress buffer or the data portion in the storing unit corresponding to the ingress buffer, and outputs the selected one to the switch.

(e) The packet communication apparatus described in (d), characterized in that the ingress buffer stores a plurality of cells of the packet data in a string format, the packet data includes a first cell, a subsequent cell and a last cell, the data portion is the first cell or the packet data including the first cell, the switch has counters corresponding to the output ports, the data portion is passed via a path switched by the switch and monitored at the output port, and the total value of cells of the packet data is stored in the counter.

(f) The packet communication apparatus described in (e), characterized in that each time the subsequent cell is monitored at the output port for the total value, the total value is decremented and, when the counter value becomes equal to or lower than a predetermined value, release of the output port is notified to the buffer control unit.

(g) The packet communication apparatus described in (a), characterized in that the ingress interface is provided with a high-priority ingress buffer, a storing unit, a low-priority ingress buffer, and a storing unit, and when the plurality of cells stored in the ingress buffer and storing unit are transferred, priorities are assigned.

(h) The packet communication apparatus described in (f), characterized in that the cell has a cell header and cell data, the cell header of the subsequent cell has an available port bit, the output port monitors the status of the available port bit and when the output port detects the change of the status of the available port bit, the buffer control unit is notified of the release.

(i) The packet communication apparatus described in (h), characterized in that the output port can request the buffer control unit to transmit the next packet data before the last cell passes.

(j) The packet communication apparatus described in (a), characterized in that the buffer control unit includes a timer monitoring unit and a receiving unit for receiving an acknowledge signal from the switch and after the data portion is transmitted from the storing unit, through monitoring by the timer monitoring unit whether the acknowledge signal is received or not within the predetermined period of time, the buffer control unit determines whether or not the scheduler permits the output of the data portion to the predetermined output port.

(k) The packet communication apparatus described in (d), characterized in that the buffer control unit has a receiving unit for receiving an acknowledge signal from the switch and when the receiving unit detects that the output of the data portion is permitted, the buffer control unit selects the packet data portion other than the data portion of the ingress buffers and when the receiving unit detects that the output of the data portion is not permitted, the buffer control unit selects any of the data portion of the plurality of the storing units and transmits one data portion to the switch.

Moreover, as a method of controlling transfer of packet data by using the above-described packet communication apparatus, packet data transfer controlling methods having the characteristics (i) to (iii) can be provided.

(i) A packet data transfer controlling method using a packet communication apparatus comprising: an ingress interface for inputting plural packet data; a switch for switching paths of the packet data, having a plurality of input ports, a plurality of output ports, and a scheduler; and an egress interface for transmitting the packet data transferred via the switched path, the ingress interface having a plurality of first storing units, a plurality of second storing units corresponding to the plurality of first storing units, and a control unit for controlling the first and second storing units, and the plurality of input ports having the corresponding plurality of third storing units, the method characterized by including: a step of storing the packet data in the first storing unit and transferring a data portion including destination information of the packet data to the second storing unit; a step of receiving the data portion output from the second storing unit by the third storing unit, selecting the data portion by the scheduler, and outputting the selected data portion to a predetermined output port; and a step of, when the data portion is not selected for the predetermined output port by the scheduler, discarding the data portion by the third storing unit and, in response to an output request further issued from the control unit, transmitting the data portion to the third storing unit by one of the plurality of second storing units.

(ii) The packet data transfer controlling method described in (i), characterized in that the packet data includes a first cell, a subsequent cell and a last cell, the first storing unit is an input queue buffer for storing the packet data, the second storing unit is a storing buffer for storing the data portion including the first cell, and the third storing unit is a port buffer for storing the data portion including the first cell.

(iii) The packet data transfer controlling method described in (i), characterized in that in the step of transmitting, when the data portion is not selected by the scheduler, the third storing unit discards the data portion, and the control unit selects one of the plurality of second storing units and outputs the data portion, and the control unit determines again whether or not the data portion is able to be transmitted to the predetermined output port by the scheduler.

According to the foregoing embodiments of the invention, the following effects can be expected.

(1) In the case of constructing a packet communication apparatus of large capacity, a switch can be provided with a small number of hardware components and with little bottleneck in a scheduling process. More specifically, a packet communication apparatus which can be easily adapted to an increase in the number of ports of a switch and improvement in port speed and can realize high throughput can be provided.

(2) A packet communication apparatus of large capacity in which a quality class control is effectively performed can be provided.

We claim:

1. A packet data transfer controlling method in a packet communication apparatus, said apparatus having:

a switch unit having a scheduler for scheduling packet transfer between a plurality of input ports and a plurality of output ports;

a plurality of ingress interfaces each coupled to one of said input ports for selectively transferring packets received from an input line to said switch unit; and a plurality of egress interfaces each coupled to one of said output ports for transmitting packets received from said switch unit to an output line, wherein each of said ingress interfaces has a plurality of pairs of a first storing unit and a second storing unit, and a control unit for selecting one of said pairs, and said switch unit having a plurality of third storing units each associated with one of said input ports so as to temporarily store packet data transferred from one of said ingress interfaces to the input port, said method comprising the steps of:

storing, by each of said ingress interfaces, packet data received from said input line in one of said first storing units, selectively and shifting a first data portion including destination information of the packet data from the first storing unit to one of said second storing units, which is paired with the first storing unit;

controlling, by each of said control units, one of said second storing units so as to transfer the first data portion to one of said third storing units, but leaving the same data in the second storing unit;

selecting, by said scheduler, at least one of said third storing units that stores the first data portion allowed to be transferred to one of said output ports;

controlling, by each of said control units, in response to a predetermined control signal from said scheduler, one of said first storing units, which is paired with said second storing unit from which said first data portion has been transferred, so as to transfer a remaining portion of the packet data to one of said third storing units selected by said scheduler;

transferring, by said switch unit, the first data portion and remaining portion output from said selected third storing unit to one of said output ports specified by the destination information of the first data portion; and controlling, by each of said control units that could not receive said predetermined control signal, another of said second storing units so as to transfer the first data portion to one of said third storing units, thereby to replace the previous first data portion with the new first data portion in the third storing unit.

2. The packet data controlling method according to claim 1, wherein each of said first storing units receives said packet data as a string of fixed length cells comprising a first cell, at least one subsequent cell and a last cell, and each of said second storing units receives a data block including said first cell as said first data portion from one of said input queue buffers, and said scheduler selects at least one of said third storing units to allow data to transfer to one of said output ports by referring to header information of first cells stored in the third storing units.

3. The packet data transfer controlling method according to claim 1, further comprising the steps of:

monitoring output data at each of said output ports to detect completion of data transfer for a packet from one of said third storing units to the output port; and notifying each of said control units of a port identifier indicating an available output port when the completion of data transfer to the output port was detected;

wherein each of said control units selects one of said second storing units which has failed to receive said predetermined control signal, after confirming from the notification that an output port to be used becomes available, thereby to transfer said first data portion to said third storing unit again.

4. A packet communication apparatus comprising:

a switch unit having a scheduler for scheduling packet transfer between a plurality of input ports and a plurality of output ports, and a plurality of ingress buffers each connected to one of said input ports;

a plurality of ingress interfaces each connected to one of said ingress buffers for selectively transferring packets received from an input line to the ingress buffer; and a plurality of egress interfaces each connected to one of said output ports for transmitting packets received from said switch unit to an output line;

wherein each of said ingress interfaces includes plural pairs of storage units, each of said pairs including a queue buffer for storing packet data and a register capable of retransmitting stored packet data, and wherein each of said ingress interfaces further includes a buffer control unit for selecting one of said pairs to output stored packet data, the register of the selected pair storing a first data block including header information of a packet received from one of said input lines and routing information for specifying one of said output ports, the queue buffer of the selected pair storing the remaining portion of the received packet, wherein said buffer control unit controls the selected register to output said first data block to one of said ingress buffers, wherein said scheduler issues an acknowledge signal to the buffer control unit if a path toward the output port specified with the routing information of the first data block in the ingress buffer is available to the ingress buffer, and wherein the buffer control unit controls the selected queue buffer to output the remaining portion of the received packet to the ingress buffer after receiving said acknowledge signal, and otherwise, the buffer control unit selects one of the other pairs of queue buffer and register to output a new first data block from the register to one of said ingress buffers, thereby to replace the previous first data block with the new first data block in the ingress buffer.

5. The packet communication apparatus according to claim 4, wherein said buffer control unit selects one of a plurality of first data blocks stored in said plurality of registers, and transfers a copy of the selected first data block to said one of ingress buffers.

6. The packet communication apparatus according to claim 4, wherein said scheduler sets up a path between said ingress buffer and said specified output port when said acknowledge signal is issued, whereby said data block and said remaining portion subsequent to the first data block are transferred to said specified output port via the path.

7. The packet communication apparatus according to claim 4, wherein each of said ingress interfaces has a plurality of selectors of the same number as that of said pairs of queue buffer and register, and each of said selector selects either said first data block in the register or said remaining portion in said queue buffer and outputs the selected one to said ingress buffer.

8. The packet communication apparatus according to claim 7, wherein each of said ingress interfaces further comprising a packet processing unit for converting each of received packets into a plurality of internal cells each including said routing information, said register stores a data block including at least a first cell, and said queue buffer stores a plurality of subsequent cells and a last cell in a string format.

9. The packet communication apparatus according to claim 8, wherein said switch unit has a plurality of counters corresponding to said output ports each for storing, as an initial counter value, a total number of internal cells belonging to the same packet to be monitored at the output port, said counter value is decremented each time said subsequent cell is monitored at said output port and, when said counter value becomes equal to or lower than a predetermined value, release of the output port is notified to said buffer control unit.

10. The packet communication apparatus according to claim 8, wherein each of said internal cells is comprised of a cell header and cell data, the cell header of each of said subsequent cells includes an available port bit, and said buffer control unit is notified of the release of said output port when the change in the status of the available port bit is detected at the output port.

11. The packet communication apparatus according to claim 10, wherein the release of said output port is issued before said last cell passes the output port so that any one of said buffer control units can start transferring packet data toward the output port from a pair of queue buffer and register to said ingress buffer before said last cell reaches the output port.

12. The packet communication apparatus according to claim 7, wherein each of said buffer control units has an acknowledge receiving unit for receiving an acknowledge signal from said switch unit, and when said acknowledge receiving unit detects that the packet transfer to said specified output port is permitted, said buffer control unit transfers the remaining portion stored in the selected queue buffer to said ingress buffer, and when said receiving unit detects that the packet transfer to said specified output port is not permitted, said buffer control unit selects one of the other pairs of queue buffer and register to output a new first data block to said ingress buffer.

13. The packet communication apparatus according to claim 4, wherein each of said ingress interfaces is provided with a high-priority pair of a queue buffer and a register and a low-priority pair of a queue buffer and a register, and said buffer control unit preferentially selects the high-priority pair if the register of the high-priority pair stores a first data block therein.

14. The packet communication apparatus according to claim 4, wherein each of said buffer control units includes a timer monitoring unit and an acknowledge receiving unit for receiving an acknowledge signal from said switch unit, and said buffer control unit selects said one of the other pairs of queue buffer and register when no acknowledge signal is received by said acknowledge receiving unit within a predetermined period of time measured by said timer monitoring unit after said first data block was output from said register.

* * * * *